United States Patent
Cole et al.

(10) Patent No.: US 7,382,286 B2
(45) Date of Patent: Jun. 3, 2008

(54) SYSTEM AND METHOD FOR THE CORRELATION OF MULTIPLE DATA FEEDS

(75) Inventors: James Cole, East Setauket, NY (US);
Robert Damis, Patchogue, NY (US);
John R. Keller, Huntington, NY (US);
Bruce A. Leidahl, Oakdale, NY (US)

(73) Assignee: Megadata Corp., Greenwich, CT (US)

( * ) Notice: Subject to any disclaimer, the term of this patent is extended or adjusted under 35 U.S.C. 154(b) by 969 days.

(21) Appl. No.: 10/457,578

(22) Filed: Jun. 9, 2003

(65) Prior Publication Data

US 2005/0021221 A1    Jan. 27, 2005

(51) Int. Cl.
*G08G 5/04*    (2006.01)
(52) U.S. Cl. .................. 340/961; 342/456; 342/465; 701/120; 708/422
(58) Field of Classification Search ............. 340/961, 340/945, 971; 342/456–465, 454, 455, 36, 342/38, 30, 34; 708/422; 701/120, 121, 701/122, 301
See application file for complete search history.

(56) References Cited

U.S. PATENT DOCUMENTS

| | | | |
|---|---|---|---|
| 4,633,261 A * | 12/1986 | Kosaka et al. ............. 342/430 |
| 5,157,615 A * | 10/1992 | Brodegard et al. ......... 701/301 |
| 5,463,398 A * | 10/1995 | Young .......................... 342/46 |
| 5,477,225 A * | 12/1995 | Young et al. ................ 342/46 |
| 6,081,764 A * | 6/2000 | Varon ........................ 701/120 |
| 6,384,783 B1 * | 5/2002 | Smith et al. ............... 342/387 |
| 7,132,982 B2 * | 11/2006 | Smith et al. ............... 342/456 |

* cited by examiner

*Primary Examiner*—Brent A. Swarthout
(74) *Attorney, Agent, or Firm*—Fay Kaplun & Marchin, LLP

(57) ABSTRACT

A method of receiving a first set of target data points from a first data feed and receiving a second set of target data points from a second data feed arrangement. Comparing a time variable included in the target data points from the first set to the time variable included in the target data points from the second set to determine time matched target data points and further comparing a second variable included in the time matched target data points from the first set to the second variable included in the corresponding time matched target data points from the second set to determine fully matched target data points. Combining the first set of target data points with the second set of target data points when the fully matched target data points satisfies a predetermined threshold.

20 Claims, 4 Drawing Sheets

SYSTEM AND METHOD FOR THE CORRELATION OF MULTIPLE DATA FEEDS

BACKGROUND INFORMATION

Entities such as individual airlines, airport operators, the Federal Aviation Authority ("FAA"), etc., may have multiple data feeds from systems which collect information about aircraft in a particular area. Each of the users of these systems may use the collected information for various purposes based on their individual responsibilities. However, a user may have to view and analyze multiple data sets to gather all the information needed to perform their assigned tasks. In addition, these multiple data sets are not correlated and it is very difficult to distinguish a data set associated with a first flight from a very similar data set for a second flight. Thus, when a user is viewing the multiple data sets, there is no assurance that the user is correlating different data sets associated with the same flight. An error in correlation may lead to the user taking the wrong action with respect to one or more flights.

SUMMARY OF THE INVENTION

A method of receiving a first set of target data points from a first data feed and receiving a second set of target data points from a second data feed arrangement. Comparing a time variable included in the target data points from the first set to the time variable included in the target data points from the second set to determine time matched target data points and further comparing a second variable included in the time matched target data points from the first set to the second variable included in the corresponding time matched target data points from the second set to determine fully matched target data points. Combining the first set of target data points with the second set of target data points when the fully matched target data points satisfies a predetermined threshold.

In addition, a system, comprising a first module configured to receive a first set of target data points from a first data feed arrangement and a second set of target data points from a second data feed arrangement, a second module configured to compare a time variable included in the target data points from the first set to the time variable included in the target data points from the second set to determine time matched target data points and to further compare a second variable included in the time matched target data points from the first set to the second variable included in the corresponding time matched target data points from the second set to determine fully matched target data points and a third module to combine the first set of target data points with the second set of target data points when the fully matched target data points satisfies a predetermined threshold.

Furthermore, a computer-readable storage medium storing a set of instructions, the set of instructions capable of being executed by a processor to correlate target data points, the set of instructions performing the steps of receiving a first set of target data points from a first data feed arrangement, receiving a second set of target data points from a second data feed arrangement, comparing a time variable included in the target data points from the first set to the time variable included in the target data points from the second set to determine time matched target data points, further comparing a second variable included in the time matched target data points from the first set to the second variable included in the corresponding time matched target data points from the second set to determine fully matched target data points and combining the first set of target data points with the second set of target data points when the fully matched target data points satisfies a predetermined threshold.

DETAILED DESCRIPTION

Figure 1:
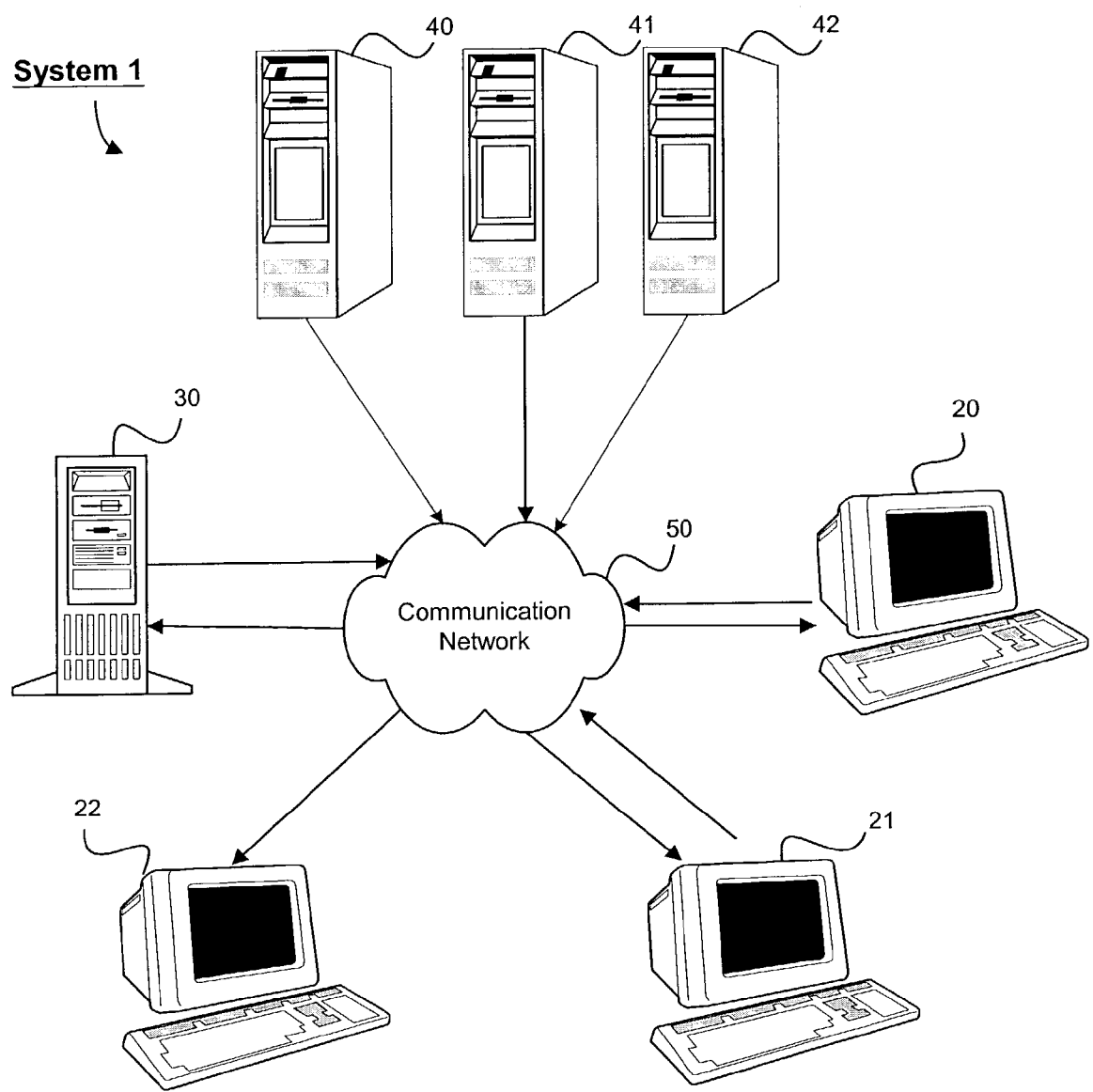
FIG. 1 shows an exemplary system according to the present invention.

The present invention may be further understood with reference to the following description of preferred exemplary embodiments and the related appended drawings, wherein like elements are provided with the same reference numerals. The exemplary embodiment of the present invention comprises a fast-communications network which is designed to communicate flight information to users of the system. The information may be viewed through the use of programs that access and display files and other data available on the communications network such as, for example, a web browser. The system may be accessible by a plurality of users such as, for example, airlines, terminal operators, Federal Aviation Authority ("FAA") towers, as well as other approved parties (e.g., airline system operation centers). Some of the information may also be made available to the general public.

FIG. 1 shows an exemplary system 1 according to the present invention. The system includes a main server 30 for storing the main database and hosting the web page (or other data distribution system) to distribute the information collected by the system. The main server 30 may be, for example, a standard PC based server system running an operating system such as LINUX. Those of skill in the art will understand that any computing platform may be used for the main server 30. The function of the main server 30 may also be distributed among a plurality of servers. The main server 30 may be connected to a communications network 50, for example, the Internet. A plurality of user's stations 20-22 may also be connected to the communication network 50. The user's stations 20-22 may be, for example, personal computers ("PCS") or other computing platforms having network or modem access. In addition, multiple data feed arrangements 40-42 may be connected to the communications network 50. In an alternative embodiment, the data feed arrangements 40-42 are connected directly to the main server 30.

The main server 30 may contain one or more databases containing relevant information. In the present description, the term database will be used to describe any manner of storing data or information including those manners other than a traditional database structure. The main server 30 may utilize a database server for the permanent or temporary logging and storage of every piece of information entered into the system 1 using a common industry language, such as, for example, standard query language ("SQL"). The main server 30 may also contain web server software to allow the main server 30 to host a web page or series of web pages in order to make the information available to users. Thus, the information stored in the main database may be formatted for distribution to the users via a standard distribution method such as web page based distribution. The web server of the main server may be capable of supporting any number of web or computer network based technologies, e.g., Hyper Text Mark-up Language ("HTML"), Java, JavaScript, C/C++, Perl, etc.

The users 20-22 may access the web page hosted by the main server 30 via the communication network 30. The users 20-22 may be able to gain access to the information via a web browser through an advanced user authentication process requiring, e.g., passwords, challenges, network and/or individual computer identification (encrypted), monitoring tools, etc., in order to ensure the security of the system. Other security measures such as redundant web servers with secure socket layer encryption ("SSL") may also be used as is known in the art.

The data feed arrangements 40-42 may be, for example, the PASSUR™ System sold by Megadata Corporation of Bohemia, New York, the ASDI data set which is available for resale from the FAA, Mode S transponder data collection, etc. Each of these data feed arrangements 40-42 may provide a stream of data which consists of target data points. Each target data point may include information about a flight being tracked. The target data points for each of the data feed arrangements 40-42 may contain different information. For example, a target data point from the PASSUR™ System may include the time (e.g., UNIX time), the x-position, the y-position, altitude, and the mode A transponder code of the aircraft. Similarly, the Mode S data set may include the 24 bit International Civil Aviation Organization ("ICAO") code, the altitude and the time. Those of skill in the art will understand that the types of data described above are only exemplary and that any particular data feed arrangement may provide a variety of information about flights in the covered area. Other examples of information available from data feeds include Mode A information and Mode C information.

The main server 30 will receive each of these target data points from each of the various data feed arrangements 40-42. Throughout this description the convention will be maintained that each discrete set of data received for a particular flight by the system 1 from the data feed arrangements 40-42 will be termed a target data point. Examples of the information included in a target data point are described above. The target data points from an individual data feed arrangement for an individual flight will be combined by the main server 30 into a target flight record and when this term is used it should be understood to mean all the target data points for each individual flight. The term target is generally used to describe a flight (or aircraft) which is to be tracked.

Figure 2:
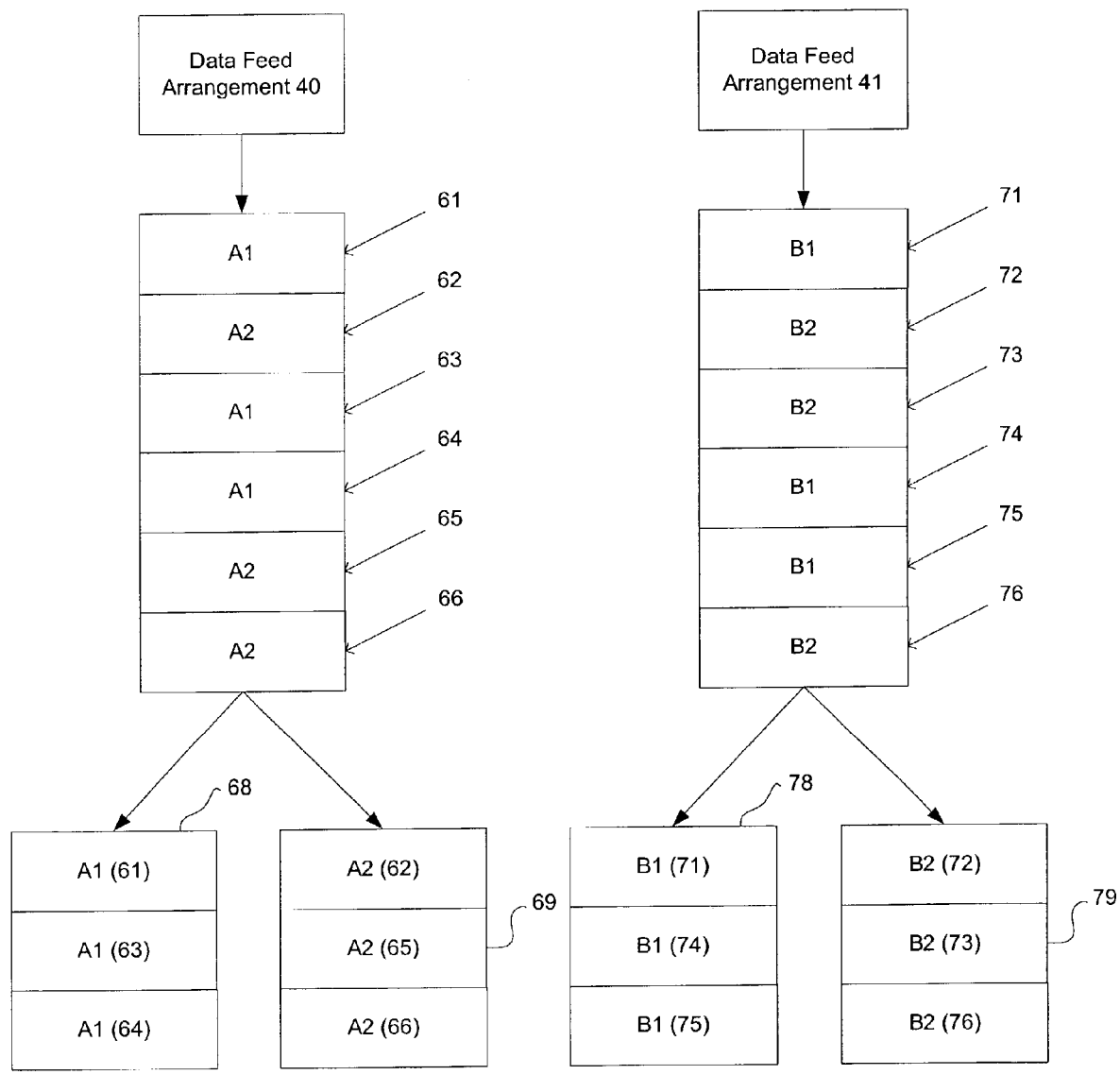
FIG. 2 shows two exemplary data sets containing target data points according to the present invention.

FIG. 2 shows two exemplary data sets 60 and 70 containing target data points 61-66 and 71-76, respectively. In this example, the data set 60 is input by the first data feed arrangement 40. The exemplary data set 60 includes a set of six target data points 61-66, where each of the target data points marked A1 (target data points 61, 63 and 64) is associated with a first target. Each of the target data points marked A2 (target data points 62, 65 and 66) is associated with a second target. Thus, the main server 30 will receive these target data points 61-66 and associate each target data point with the appropriate target data record, e.g., target data points 61, 63 and 64 will be associated with a target flight record 68 for the first target and target data points 62, 65 and 66 will be associated with a target flight record 69 for the second target.

Similarly, the exemplary data set 70 includes a set of six target data points 71-76, where each of the target data points marked B1 (target data points 71, 74 and 75) is associated with a first target. Each of the target data points marked B2 (target data points 72, 73 and 76) is associated with a second target. Thus, the main server 30 will receive these target data points 71-76 and associate each target data point with the appropriate target data record, e.g., target data points 71, 74 and 75 will be associated with a target flight record 78 for the first target and target data points 72, 73 and 76 will be associated with a target flight record 79 for the second target.

The users of the system 1 may desire that the main server 30 combine each of the target data records for a particular aircraft into one logical data record to give the user a complete description of the target aircraft. However, the main server 30 does not know whether the particular target data points input by a first data feed arrangement for a first aircraft correlate to target data points for the same aircraft which are input by a second data feed arrangement. For example, the target data points 61, 63 and 64 associated with the target flight record 68 input by data feed arrangement 40 for a first target may correlate to target data points 71, 74 and 75 associated with the target flight record 78, the target data points 72, 73 and 76 associated with the target flight record 79 or neither of the target data points associated with target records 78 and 79. Thus, the main server 30 must have a manner of correlating this information so that the user can obtain the most complete description of each aircraft which is being tracked.

Figure 3:
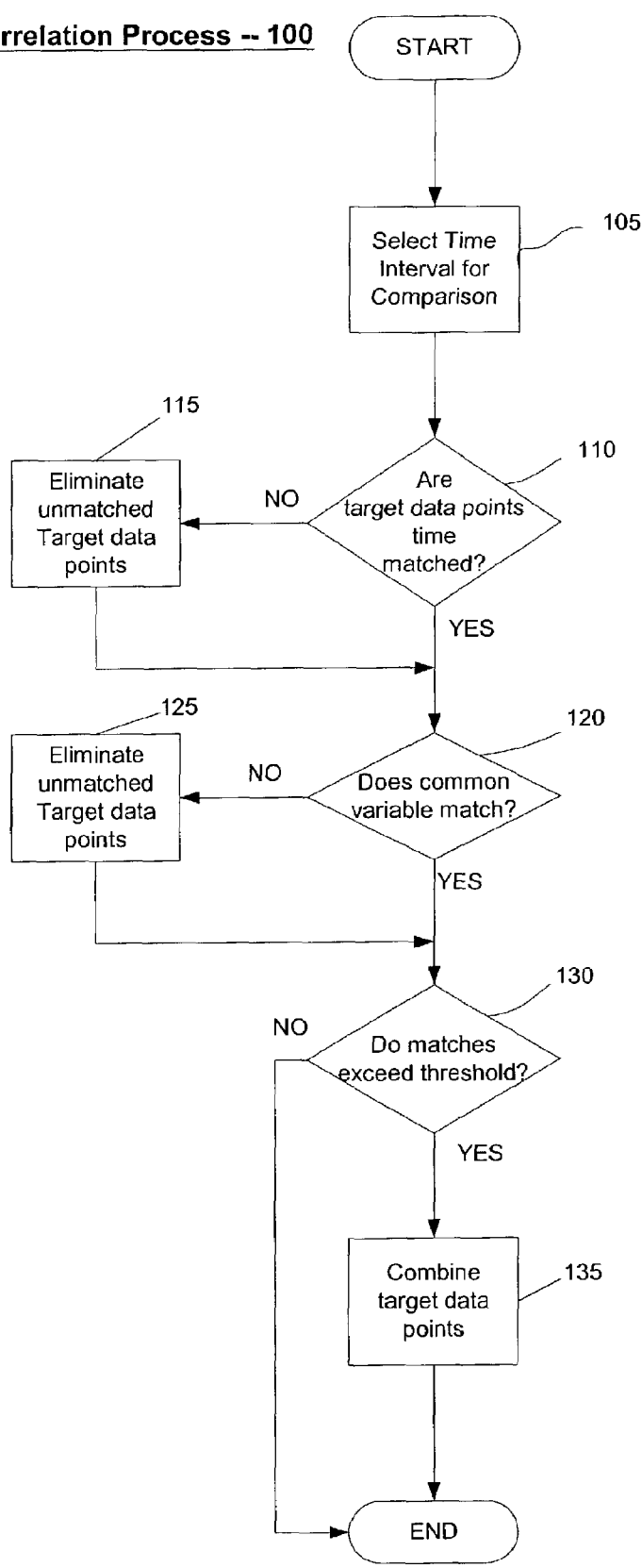
FIG. 3 shows an exemplary process for correlating target data points from different data feed arrangements according to the present invention.
Figure 4:
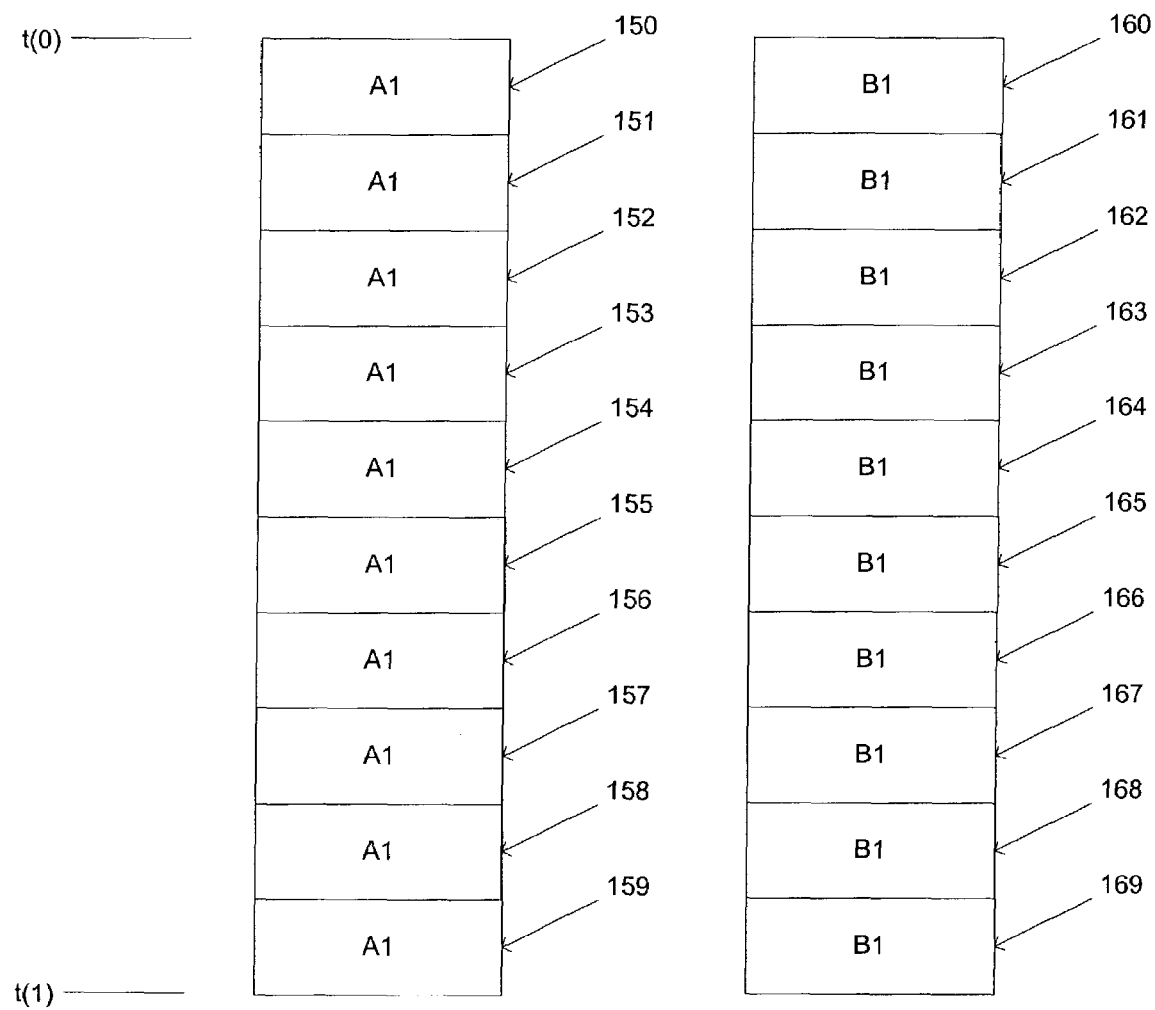
FIG. 4 shows two exemplary target data records which each contain a set of target data points according to the present invention.

FIG. 3 shows an exemplary process 100 for correlating target data points from different data feed arrangements. The exemplary embodiment of the process 100 may be performed by software residing in the main server 30. However, those of skill in the art will understand that the correlation of data may be performed by software residing in other portion of the exemplary system 1. In describing the exemplary process 100, the exemplary target data points 150-159 and 160-169 will be used as an example. FIG. 4 shows two exemplary target data records which each contain a set of target data points 150-159 and 160-169, respectively. In this example, it may be considered that the first set of data points 150-159 are for a target aircraft which were input from the first data feed arrangement 40 which is the PASSUR™ System described above. It may also be considered that the second set of data points 160-169 are for a target aircraft which were input from the second data feed arrangement 40 which is the Mode S system described above. The main server 30 needs to determine whether the first set of data points 150-159 correlate to the second set of data points 160-169.

In the first step 105, the main server selects a time interval over which the main server will compare target data points for correlation. As described above, both the PASSUR™ System and the Mode S system include a time in each target data point. Thus, each of the target data points in the first data set 150-159 and second data set 160-169 may be queried to determine whether they fall within the selected time interval. Those of skill in the art will understand that the selected time interval should be large enough so that a statistically significant number of target data points may be compared to determine whether there is a correlation. For example, in a preferred embodiment, data is considered to be correlated when there are six (6) different altitude matches. Therefore, in the preferred embodiment, at least six different target data points from each data feed are required to attempt to correlate the target data points. In addition, in the preferred embodiment, the selected time interval is the entire history of all tracks up to the current time (meaning the collection of target data points for each aircraft that is being or was tracked). However, those of skill in the art will understand that a lesser time interval may also be used.

In the example of FIG. 4, the selected time period is t(0) to t(1). Thus, each of the data points in the first data set 150-159 and second data set 160-169 are included in the selected time interval. The process then continues to step 110 where it is determined if there is a time match between target data points. A threshold for the time match may be established, e.g., 1 second. For example, it may be determined that target data point 150 was input within 1 second of the target data point 160. Thus, these two target data points are time matched. It may be possible that a target data point has multiple time matches. For example, the target data point 151 may have been input within 1 second of the target data points 161, 162 and 163. Thus, each of the target data points 161, 162 and 163 are time matches for the target data point 151.

Similarly, there may be target data points which do not have any time matches. For example, none of the target data points 160-169 in the second data set may be within 1 second of the target data point 155. Thus, the target data point 155 does not have any time match. As shown in step 115, those target data points which do not have a time match are eliminated. Those of skill in the art will understand that the threshold of 1 second is only exemplary and that any time threshold may be selected. The threshold selection may be dependent on the time interval between successive inputs by each of the data feed arrangements.

After the time matches are made in step 110, the matched target data points are further compared in step 120 to determine if there is a match between another common variable in each of the time matched target data points. For example, the PASSUR™ System and the Mode S system include an altitude variable in each target data point. Therefore, in this example, the main server 30 will compare the altitude variable contained in each of the time matched data points. If the common variable matches, the time matched target data points may be considered to be fully matched target data points.

Continuing the example started above where it was considered that target data points 150 and 160 were time matched. In step 120, the altitude variables are compared to determine whether there is a match between these target data points 150 and 160. Similar to the time comparison, an altitude threshold may be set, e.g., 100 feet. If the altitude variables of the two target data points 150 and 160 match within the threshold, e.g., 100 feet, the target data points 150 and 160 may be considered to be fully matched. If the altitude variables for the target data points 150 and 160 are outside the threshold value, these target data points may be eliminated as a match as shown in step 125 of process 100.

Those of skill in the art will understand that using the altitude as the common variable is only exemplary of a common variable of the PASSUR™ System and the Mode S system. Other systems may have different common variables which may be compared to determine if there is a full match. For example, two systems may have the X-position and the Y-position as two common variables. In this case, the step 120 may include two substeps of first comparing the X-position of each of the time matched target data points and then comparing the Y-position of these time matched target data points. If these two variables match within the predetermined threshold, then the target data points may be considered to be fully matched. Thus, there may be various common variables which may be used to confirm a full match between time matched target data points.

The process then continues to step 130 to determine whether the number of fully matched target data points are greater than a predetermined threshold. If the number of matches is greater than the predetermined threshold, it may considered that the target data points are correlated and therefore, the target data points from the two different data feeds include information about the same target aircraft. An exemplary threshold may be that over the common time interval, ≧90% of the time matched target data points must also have a common variable match, e.g., an altitude match.

For example, consider that each of the target data points in the first data set 150-159 were time matched to one of the target data points in the second data set 160-169, e.g., target data points 150 and 160 are time matched, target data points 151 and 161 are time matched, etc. If it were determined that nine out of the ten (90%) of these time matched target data points were also altitude matched, the exemplary threshold set forth above would be satisfied. Thus, the system 1 may consider that the target data points are correlated and therefore, the target data points 150-159 from the first data feed arrangement and the target data points 160-169 from the second data feed arrangement include information about the same target aircraft. Those of skill in the art will understand that the threshold described above is only exemplary and that other thresholds may be set by the user and/or developer of the system, e.g., an absolute number of fully matched target data points, a sliding scale based on the quality of the matches (within 25 feet, within 50 feet, etc.), etc.

The process may then continue to step 135 where the main server 30 combines the target data points from the two different data feed arrangements into a single target record. The system 1 may then display this complete description of the target aircraft to the user. Those of skill in the art will understand that the target data points which were eliminated in steps 115 and 125 remain part of the overall data for the target aircraft and will be included in the displayed overall data for the aircraft. In addition, as more target data points are gathered for this particular aircraft from the two different data feed arrangements, these new target data points may be included in the complete description of the aircraft, i.e., once a positive correlation is determined, it is not necessary to correlate new data from the data feed arrangements that can be associated with the particular target.

However, if in step 130, the fully matched target data points do not match the threshold criteria, the process 100 ends because it cannot be determined to a relative degree of certainty that the two different sets of target data points 150-159 and 160-169 include information about the same target aircraft. It may be possible to attempt a correlation at a later time when additional data is received from the data feed arrangements.

In the preceding specification, the present invention has been described with reference to specific exemplary embodiments thereof. It will, however, be evident that various modifications and changes may be made thereunto without departing from the broadest spirit and scope of the present invention as set forth in the claims that follow. The specification and drawings are accordingly to be regarded in an illustrative rather than restrictive sense.

What is claimed is:

1. A method, comprising the steps of:
   receiving a first set of target data points from a first data feed arrangement, the first set of target data points including a first plurality of variables;

receiving a second set of target data points from a second data arrangement, the second set of target data points including a second plurality of variables wherein at least one variable of the second plurality is not included in the first plurality of variables;

comparing a time variable included in the target data points from the first set to the time variable included in the target data points from the second set to determine time matched target data points;

further comparing a second variable included in the time matched target data points from the first set to the second variable included in the corresponding time matched target data points from the second set to determine fully matched target data points; and combining the first set of target data points with the second set of target data points when the fully matched target data points satisfies a predetermined threshold.

2. The method according to claim 1, wherein the combined first set of target data points and the second set of target data points describe a single target aircraft.

3. The method according to claim 1, wherein the second variable is an altitude variable.

4. The method according to claim 3, wherein the second variable comparing step results in fully matched target data points when the altitude variable matches within a second predetermined threshold.

5. The method according to claim 4, wherein the second predetermined threshold is 100 feet.

6. The method according to claim 1, further comprising the step of:
further comparing a third variable included in the fully matched target data points from the first set to the third variable included in the corresponding fully matched target data points from the second set.

7. The method according to claim 1, wherein the target data points include one of Mode S information, Mode A information, Mode C information, ASDI information and PASSURTM information.

8. The method according to claim 1, wherein the time comparing step results in the matched target data points when the time variable matches within a second predetermined threshold.

9. The method according to claim 8, wherein the second predetermined threshold is in a range of 0.5 to 5 seconds.

10. The method according to claim 1, further comprising the step of:
displaying the information included in the combined first set of target data points and second set of target data points.

11. The method according to claim 1, wherein the predetermined threshold is 90% of the time matched target data points are fully matched target data points.

12. A system, comprising:
a first module configured to receive a first set of target data points from a first data feed arrangement and a second set of target data points from a second data feed arrangement, the first set of target data points including a first plurality of variables, the second set of target data points including a second plurality of variables wherein at least one variable of the second plurality is not included in the first plurality of variables;

a second module configured to compare a time variable included in the target data points from the first set to the time variable included in the target data points from the second set to determine time matched target data points and to further compare a second variable included in the time matched target data points from the first set to the second variable included in the corresponding time matched target data points from the second set to determine fully matched target data points; and a third module to combine the first set of target data points with the second set of target data points when the fully matched target data points satisfies a predetermined threshold.

13. The system according to claim 12, wherein the second variable is an altitude variable.

14. The system according to claim 12, wherein the target data points include one of Mode S information, Mode A information, Mode C information, ASDI information and PASSUR™ information.

15. The system according to claim 12, wherein time matched target data points result when the time variable matches within a second predetermined threshold.

16. The system according to claim 15, wherein the second predetermined threshold is in a range of 0.5 to 5 seconds.

17. The system according to claim 12, further comprising:
a fourth module configured to convert the combined first set of target data points and second set of target data points into a displayable file.

18. The system according to claim 17, further comprising:
a fifth module configured to distribute the displayable file to users of the system.

19. The system according to claim 12, wherein the predetermined threshold is in a range of 75-100% of the time matched target data points are fully matched target data points.

20. A computer-readable storage medium storing a set of instructions, the set of instructions capable of being executed by a processor to correlate target data points, the set of instructions performing the steps of:
receiving a first set of target data points from a first data feed arrangement, the first set of target data points including a first plurality of variables;

receiving a second set of target data points from a second data feed arrangement, the second set of target data points including a second plurality of variables wherein at least one variable of the second plurality is not included in the first plurality of variables;

comparing a time variable included in the target data points from the first set to the time variable included in the target data points form the second set to determine time matched target data points;

further comparing a second variable included in the time matched target data points from the first set to the second variable included in the corresponding time matched target data points from the second set to determine fully matched target data points; and combining the first set of target data points with the second set of target data points when the fully matched target data points satisfies a predetermined threshold.

* * * * *